UNITED STATES PATENT OFFICE.

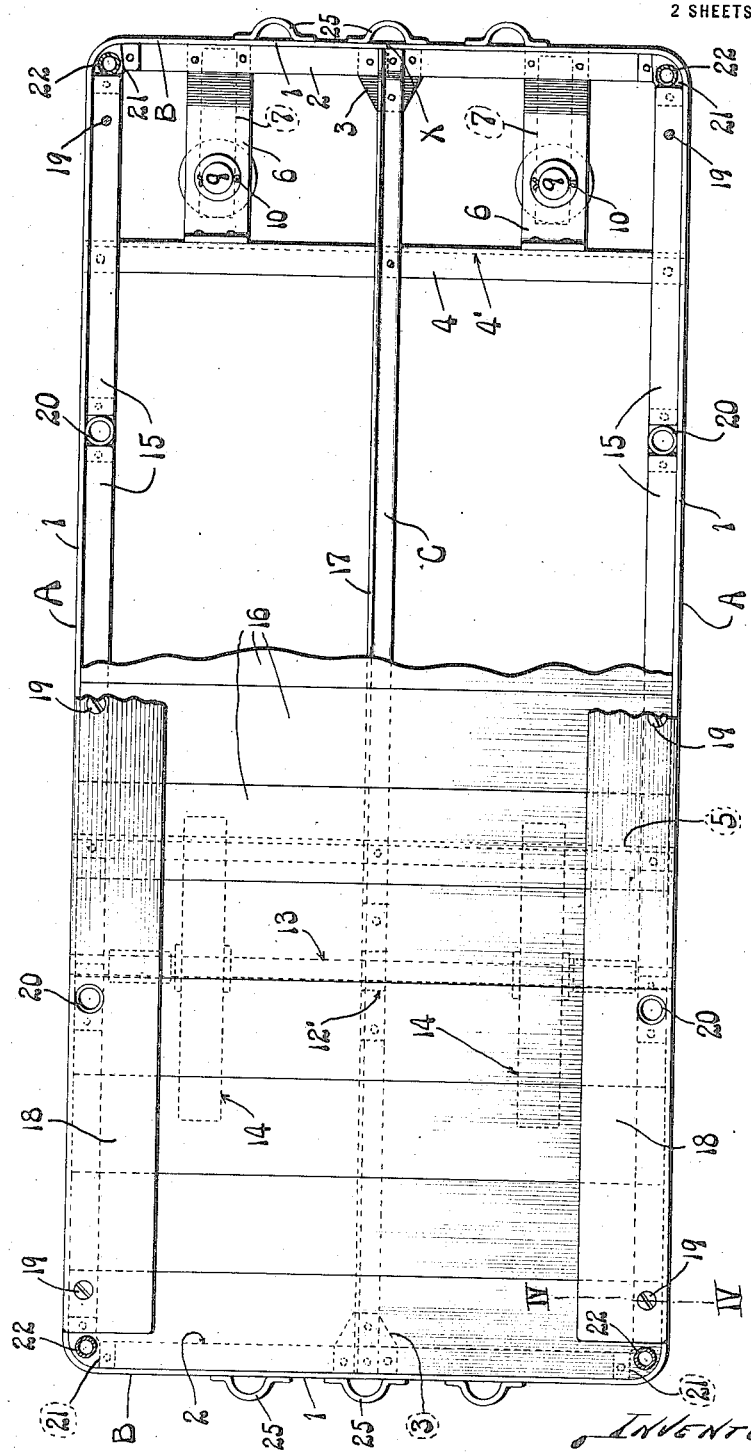

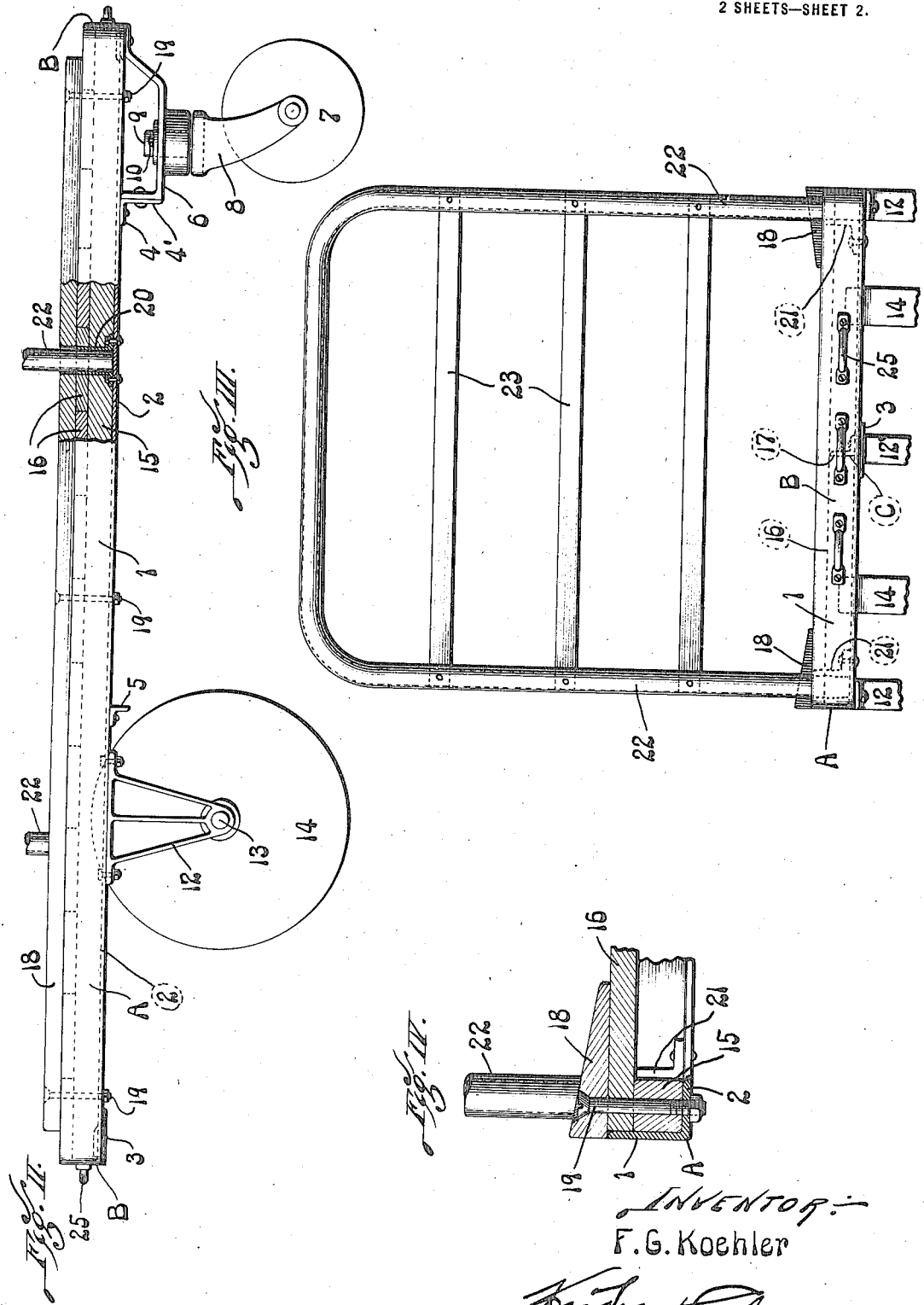

FRANK G. KOEHLER, OF ST. LOUIS, MISSOURI.

TRUCK.

1,221,997. Specification of Letters Patent. Patented Apr. 10, 1917.

Application filed March 16, 1916. Serial No. 84,603.

*To all whom it may concern:*

Be it known that I, FRANK G. KOEHLER, a citizen of the United States of America, a resident of the city of St. Louis, State of Missouri, have invented certain new and useful Improvements in Trucks, of which the following is a full, clear, and exact description, reference being had to the accompanying drawings, forming a part of this specification.

My invention relates to improvements in trucks, and the novel features are particularly adapted for use in large freight or baggage trucks. One of the objects of the invention is to produce an inexpensive truck frame consisting of a few simple parts combined with each other to produce a very strong and serviceable truck frame. Another object is to produce a simple means for securing the flooring to the truck frame. A frame is preferably provided with upturned marginal flanges between which the flooring boards are confined, and these boards are preferably secured by long retainer strips extending over the ends of the boards and fastened to the frame by means of a few removable fastening devices. This simple fastening means allows the flooring to be very easily applied to the frame in manufacturing the truck, also allowing the flooring to be removed very easily in repairing the truck.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a top or plan view of a truck embodying the features of my invention, a portion of the flooring being broken away to show the metallic truck frame.

Fig. II is a side elevation, partly in section.

Fig. III is an end view, the lower portions of the wheels and bearings being broken away.

Fig. IV is a section on line IV—IV, Fig. I, showing the means for securing the flooring to the truck frame.

The truck frame comprises side sills A and end sills B, all of which are preferably formed by a single angle bar bent to form a single rectangular marginal frame member. The ends of this single angle bar abut against each other at the point indicated by X in Fig. I. Since the side and end sills are formed integral with each other it is unnecessary to employ gusset plates, rivets, or other fastening devices for connecting these sills at the corners of the frame. Each of the sills A and B is provided with a vertical flange 1 and a horizontal flange 2 extending inwardly from the lower edge of said vertical flange. C designates a longitudinal center sill extending from one end of the truck frame to the other, said center sill being an angle bar having a horizontal flange which rests upon the horizontal flanges of the end sills. Gusset plates 3 arranged below the end sills and also below the end portions of the center sill C, are secured to said parts by means of rivets, as shown most clearly in Fig. I. The ends of the single angle bar, which abut against each other at the point X in Fig. I, are connected by means of one of the gusset plates 3. Angle bars 4 and 5, arranged transversely of the frame, are provided with horizontal flanges which engage the bottom faces of the longitudinal sills A and C, said parts being secured together by means of rivets. The vertical flanges 4' of the angle bar 4 are connected to the horizontal flange of one of the end sills B by means of bearing members 6. These bearing members abut against the vertical flanges 4' and the horizontal flange of the adjacent end sill A. It will now be understood that the truck frame I have shown consists of a single angle bar forming the side and end sills, a longitudinal center sill C connecting said end sills, transverse angle bars 4 and 5 connecting the side and center sills, and bearing members 6 connecting the transverse angle bar 4 to one of the end sills.

Wheels 7 are rotatably mounted in bearings at the lower ends of a pair of wheel holders 8. Each wheel holder is provided with a vertical stem 9 which extends through one of the bearing members 6, as shown in Figs. I and II. 10 designates pins extending through the upper portions of the vertical stems 9 to secure the wheel holders 8 to the truck frame. The wheels 7 are free to rotate about their horizontal axes, the wheel holders 8 will turn freely about the vertical axes of their vertical stems 9.

Side and intermediate bearings 12 and 12', secured to the side and center sills A and C respectively, extend downwardly from the bottom faces of said sills, as shown most clearly in Figs. II and III. A horizontal axle 13, extending across the truck, is rotatably mounted in the bearings 12 and 12'. 14 designates wheels secured to the horizontal axle 13.

Filler blocks 15, seated on the inturned horizontal flanges 2 of the side sills A, constitute end supports for flooring boards 16 which extend across the truck. The longitudinal center sill C preferably has a vertical flange 17 which engages the flooring boards 16 at the center of the truck, see Figs. I and III. The end faces of the flooring boards 16 are confined between the vertical flanges 1 of the side sills (Figs. I and IV), and these end faces preferably abut against said flanges 1 to prevent said boards from moving transversely of the truck. The means for securing the flooring boards also includes longitudinal retaining strips 18 arranged over the end margins of the flooring boards and secured to the truck frame by means of vertical bolts 19 passing through (Fig. IV) the retaining strips 18, flooring boards 16, filler blocks 15 and horizontal flanges 2. In the drawings, I have shown three vertical bolts 19 at each side of the truck, and it will be apparent that all of the flooring boards may be readily removed from the frame by removing these bolts 19 and then lifting the boards 16 from the filler blocks 15. Obviously, the flooring boards, filler blocks and retaining strips 18 may be readily applied to the frame in manufacturing the truck, and very easily removed from the frame in repairing the truck. The top face of each flooring board 16 is preferably flush with the upper edge of the side sills A (Fig. IV) and the retaining strips 18 preferably extend over the vertical flanges 1 of the side sills. The ends of the flooring boards are thus protected from injury when the truck is in service.

The top face of each retaining strip 18 is inclined downwardly and inwardly toward the flooring so as to form inclined seats for the articles carried by the truck, the object being to allow the articles to rest partly upon the inclined face of a retaining strip 18 and partly upon the flooring 16 so that they will not be thrown from the truck when the latter is turned around a corner when running at a high rate of speed.

20 designates side pockets secured to the side sills A, and 21 designates end pockets secured at the corners of the truck. These pockets are open at the top to receive frames or racks for retaining the articles on the truck. Each frame or rack (Figs. I and III) is provided with a pair of vertical posts 22 the lower ends of which are adapted to be inserted into the pockets 20 and 21, and bars 23 connecting said vertical posts. There is a pair of pockets 21 at each end of the truck and a pair of pockets 20 at each side of the truck, the distance between the pockets at each end of the truck being the same as the distance between the pockets at each side of the truck. Therefore, the posts 22 of the racks or frames may be inserted into the pockets 21 at the opposite ends of the truck, as shown in Figs. I and III, or they may be inserted into the pockets 20 at the opposite sides of the truck. 25 designates loop members secured to the end sills B adapted to receive coupling chains or other coupling devices for connecting a number of the trucks together.

I claim:—

1. A truck having a frame including a pair of side sills and a pair of end sills all of which are formed by a single angle bar bent to form a single rectangular marginal frame member, a longitudinal sill connecting said end sills, and transverse members connecting said side sills at points between said end sills.

2. A truck having a frame including a pair of side sills and a pair of end sills all of which are formed by a single angle bar bent to form a single rectangular marginal frame member, said single angle bar having a vertical flange forming the outer edge of the frame and a horizontal flange extending inwardly from the lower edge of said vertical flange, a longitudinal center sill connecting said end sills, the ends of said longitudinal center sill being connected to said horizontal flange, and transverse members connecting said side sills, the ends of said transverse members being secured to said horizontal flange.

3. A truck having a frame including side and end sills, a transverse frame member parallel with said end sills, bearing members connecting said transverse frame member to one of said end sills, and a wheel-carrying device fitted to each of said bearing members.

4. A truck having a frame including side and end sills, each of said end sills being provided with a horizontal flange, a transverse frame member parallel with said end sills, said transverse frame member having a vertical flange, bearing member connecting the vertical flange of said transverse frame member to the horizontal flange of one of the end sills, and a wheel carrying device fitted to each of said bearing members.

5. A truck having a frame including side and end sills, a longitudinal sill parallel with said side sills, side and intermediate bearings secured to said side and intermediate sills, an axle fitted to said bearings, and wheels carried by said axle.

6. A truck having a frame, provided with pockets at its ends and sides, the distance between the pockets at the sides being the same as the distance between the pockets at the ends, and a pair of retaining frames each having a pair of posts adapted to be inserted into the side pockets or the end pockets.

7. A truck having a frame provided with a pair of pockets at each side and a pair of pockets at each end, the distance between the pockets at each side being the same as the distance between the pockets at each end, and a pair of retaining frames each having a pair of posts adapted to be inserted into either pair of pockets at the sides of the frames and also adapted to be inserted into either pair of pockets at the ends of the frame.

8. A truck having a frame including oppositely disposed marginal sills each having an upturned flange at its outer edge and a horizontal flange extending inwardly from the lower edge of said upturned flange, flooring members confined between the upturned flanges, the end margins of said flooring members being located directly above said horizontal flanges, filler blocks arranged directly between said horizontal flanges and the end margins of said flooring members, said filler blocks being seated on said horizontal flanges and said flooring members being seated on said filler blocks, and means for securing said filler blocks and flooring members between said upturned flanges.

9. A truck having a frame, flooring extending across said frame, and retaining strips secured to the side margins of the truck, the top faces of said retaining strips being inclined downwardly and inwardly toward the flooring to form inclined seats for the articles carried by the truck.

10. A truck having a frame including a pair of side sills and a pair of end sills all of which are formed by a single angle bar bent to form a single rectangular marginal frame member, said single angle bar having a vertical flange forming the outer edge of the frame and a horizontal flange extending inwardly from the lower edge of said vertical flange, means for connecting the ends of said single angle bar to produce a continuous unitary frame, and a transverse bar uniting said side sills.

11. A truck having a frame including oppositely disposed marginal sills each having an upturned flange at its outer edge and a horizontal flange extending inwardly from the lower edge of said upturned flange, flooring members confined between the upturned flanges, the end margins of said flooring members being located directly above said horizontal flanges, retaining strips arranged above and extending across the end margins of said flooring members, and means for securing said retaining strips to said frame so as to retain the end margins of said flooring members between said horizontal flanges and the retaining strips and also between the upturned flanges of the sills, said means comprising bolts passing through said retaining strips and horizontal flanges.

12. A truck having a frame including oppositely disposed marginal sills each having an upturned flange at its outer edge and a horizontal flange extending inwardly from the lower edge of said upturned flange, flooring members confined between the upturned flanges, the end margins of said flooring members being located directly above said horizontal flanges, fillers interposed between said horizontal flanges and the end margins of said flooring members, said fillers constituting supports for said flooring members, and means for securing said fillers and flooring members between said upturned flanges.

FRANK G. KOEHLER.